(12) United States Patent
Xie

(10) Patent No.: US 12,480,792 B2
(45) Date of Patent: Nov. 25, 2025

(54) CARBON DIOXIDE MULTIPHASE FLOW MEASUREMENT BASED ON DIELECTRIC PERMITTIVITY

(71) Applicant: Schlumberger Technology Corporation, Sugar Land, TX (US)

(72) Inventor: Cheng-Gang Xie, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 386 days.

(21) Appl. No.: 18/063,158

(22) Filed: Dec. 8, 2022

(65) Prior Publication Data

US 2024/0151564 A1 May 9, 2024

Related U.S. Application Data

(60) Provisional application No. 63/382,753, filed on Nov. 8, 2022.

(51) Int. Cl.
| | | |
|---|---|---|
| G01F 1/36 | (2006.01) | |
| G01F 1/20 | (2006.01) | |
| G01F 1/44 | (2006.01) | |
| G01F 1/74 | (2006.01) | |

(52) U.S. Cl.
CPC .............. *G01F 1/363* (2013.01); *G01F 1/206* (2013.01); *G01F 1/74* (2013.01); *G01F 1/44* (2013.01)

(58) Field of Classification Search
CPC . G01F 1/363; G01F 1/206; G01F 1/74; G01F 1/44
See application file for complete search history.

(56) References Cited

U.S. PATENT DOCUMENTS

| | | | |
|---|---|---|---|
| 5,259,239 A | 11/1993 | Gaisford | |
| 7,908,930 B2* | 3/2011 | Xie | G01N 33/2823 |
| | | | 73/861.04 |
| 8,525,534 B2* | 9/2013 | Brandt | G01F 1/74 |
| | | | 324/724 |

(Continued)

FOREIGN PATENT DOCUMENTS

| | | |
|---|---|---|
| WO | 2017068144 A1 | 4/2017 |
| WO | WO 2019/240653 | * 12/2019 |
| WO | 2020206368 A1 | 10/2020 |

OTHER PUBLICATIONS

Search Report and Written Opinion issued in the PCT Application No. PCT/US2023/035863 dated Feb. 16, 2024, 8 pages.

(Continued)

*Primary Examiner* — Lina Cordero
*Assistant Examiner* — Lynda Dinh
(74) *Attorney, Agent, or Firm* — Jeffrey D. Frantz

(57) ABSTRACT

Methods and apparatus for determining mass flow rate of a $CO_2$ rich stream using dielectric permittivity are described. A method herein measures a dielectric permittivity of a $CO_2$ rich stream; determines a density of the $CO_2$ rich stream from the measured dielectric permittivity; determines a viscosity of the $CO_2$ rich stream from the measured dielectric permittivity; measures a pressure drop of the $CO_2$ rich stream flowing through a flow restriction; and determines mass flow rate of the $CO_2$ rich stream using the measured pressure drop, the determined density, and the determined viscosity.

8 Claims, 4 Drawing Sheets

(56) References Cited

U.S. PATENT DOCUMENTS

| | | | |
|---|---|---|---|
| 8,536,883 | B2 | 9/2013 | Xie et al. |
| 9,927,270 | B2 | 3/2018 | Xie |
| 10,132,847 | B2 | 11/2018 | Xie |
| 11,099,168 | B2 | 8/2021 | Xie et al. |
| 11,333,538 | B2* | 5/2022 | Mahalingam ............ G01F 1/586 |
| 2007/0124091 | A1* | 5/2007 | Wee .......................... G01F 1/58 |
| | | | 702/49 |
| 2011/0267074 | A1 | 11/2011 | Xie et al. |
| 2016/0187532 | A1* | 6/2016 | Hurley .................... E21B 25/00 |
| | | | 702/12 |
| 2021/0172848 | A1* | 6/2021 | Nour ....................... G01N 11/08 |
| 2021/0372838 | A1* | 12/2021 | Feng ......................... G01F 1/42 |
| 2021/0404849 | A1 | 12/2021 | Xie et al. |
| 2022/0026376 | A1* | 1/2022 | Undheim ............. G01N 27/223 |
| 2022/0349797 | A1* | 11/2022 | Macdonald .............. G01N 9/36 |

OTHER PUBLICATIONS

Al-Siyabi, I., "Effect of Impurities on CO2 Stream Properties", 2013, PhD Thesis, Heriot-Watt University, 201 pages.

Collie, G. J. et al. "Review of flowmeters for carbon dioxide transport in CCS applications", Greenhouse Gases: Science and Technology, 2017, 7(1), pp. 10-28.

Glen, N. et al. "Measurement Challenges for Carbon Capture and Storage", Measurement & Control, 2011, 44(3), pp. 81-85.

Green, T. et al., "Two-Phase CO2 Measurement and Control in the Yates Oil Field", Measurement & Control, 2008, 41(7), pp. 205-207.

Mills, C., "Flow Measurement in Support of Carbon Capture, Utilization and Storage (CCUS)", 2021, Report No. 2021-299, TUV SUD National Engineering Laboratory, 38 pages.

Moriyoshi, T. et al., "Static Relative Permittivity of Carbon Dioxide and Nitrous Oxide up to 30 MPa", Berichte der Bunsengesellschaft fur physikalische Chemie, 1993, 97(4), pp. 589-596.

Nazeri, M. et al., "Viscosity of CO2-rich mixtures from 243 K to 423 K at pressures up to 155 MPa: New experimental viscosity data and modelling" The Journal Chemical Thermodynamics, 2018, 118, pp. 100-114.

Nazeri, M. et al., "The Fiscal Metering of Transported CO2-Rich Mixtures in CCS Operations", Energy Procedia, 2017, 114, pp. 6766-6777.

Schmidt, J. W. et al., "Dielectric Permittivity of Eight Gases Measured with Cross Capacitors", International Journal of Thermophysics, 2003, 24(2), pp. 374-403.

Vitali, M. et al., "Thermodynamic challenges for CO2 pipelines design: A critical review on the effects of impurities, water content, and low temperature", International Journal of Greenhouse Gas Control, 2022, 114, 11 pages.

Wang, L. et al., "Mass flow measurement of gas-liquid two-phase CO2 in CCS transportation pipelines using Coriolis flowmeters", International Journal of Greenhouse Gas Control, 2018, 68, pp. 269-275.

Wesch, A. et al., "Measuring the Static Dielectric Constants of Pure Carbon Dioxide and Carbon Dioxide Mixed with Ethanol and Toluene at Elevated Pressures", Berichte der Bunsengesellschaft fur physikalische Chemie, 1996, 100(8), pp. 1368-1371.

Yan, Y. et al. "Harnessing the power of machine learning for carbon capture, utilisation, and storage (CCUS)—a state-of-the-art review", Energy Environmental Science, 2021, 14, pp. 6122-6157.

* cited by examiner

CARBON DIOXIDE MULTIPHASE FLOW MEASUREMENT BASED ON DIELECTRIC PERMITTIVITY

CROSS REFERENCE TO RELATED APPLICATION(S)

This application claims priority to and the benefit of U.S. Provisional Patent Application No. 63/382,753, filed on Nov. 8, 2022, the entirety of which is hereby incorporated by reference herein.

FIELD

This patent application relates to apparatus and methods for measuring mass flow rate of a $CO_2$ rich stream. Specifically, apparatus and methods for measuring mass flow rate of a multi-phase $CO_2$ rich stream using dielectric permittivity are described.

BACKGROUND

Carbon capture, utilization, storage (CCUS), or Carbon capture, sequestration (CCS) applications at surface or subsea rely on accurate measurements of $CO_2$ mass flow rate to manage reporting, inventory, distribution, and other aspects of such operations. Accurate measurements are desired for process control, leak detection, and verification of $CO_2$ quantities for regulatory purposes. In one instance, mass flow rate error of no more than 2.5% may be required.

Currently, ultrasonic meters, turbine meters and Coriolis meters have been used and/or proposed for mass flow measurement of $CO_2$ rich streams. The ultrasonic meters and turbine meters are used to measure volumetric flow in a dense liquid or supercritical phase, and pressure-temperature-volume (PVT) or equation-of-state (EoS) models or gamma densitometers are used to determine or measure flow density in order to calculate mass flow rate. Such methods are complicated by the complexity in the changing phase behavior of $CO_2$ rich streams with different impurities and in the difficulty in controlling fluid flow phase which can cause multi-phase conditions to arise near e.g. $CO_2$ critical point pressure ($P_c$=73.77 bar) and temperature ($T_c$=30.98 deg C.).

Coriolis flow meters have been tested, and have been determined, in one case, to have 5% error for two-phase flow of a $CO_2$ rich stream. Use of machine learning techniques to classify flow patterns, along with individual phase models have been shown to improve the result obtained from Coriolis flow meters to an error rate of 1.5-2%, but Coriolis devices for large pipes are relatively bulky and expensive.

Improved methods and apparatus for accurate measurement of mass flow rate of a $CO_2$ rich stream are needed.

SUMMARY

Embodiments described herein provide a method, comprising measuring a dielectric permittivity of a $CO_2$ rich stream; determining a density of the $CO_2$ rich stream from the measured dielectric permittivity; determining a viscosity of the $CO_2$ rich stream from the measured dielectric permittivity; measuring a pressure drop of the $CO_2$ rich stream flowing through a flow restriction; and determining mass flow rate of the $CO_2$ rich stream using the measured pressure drop, the determined density, and the determined viscosity.

DETAILED DESCRIPTION

Figure 1A:
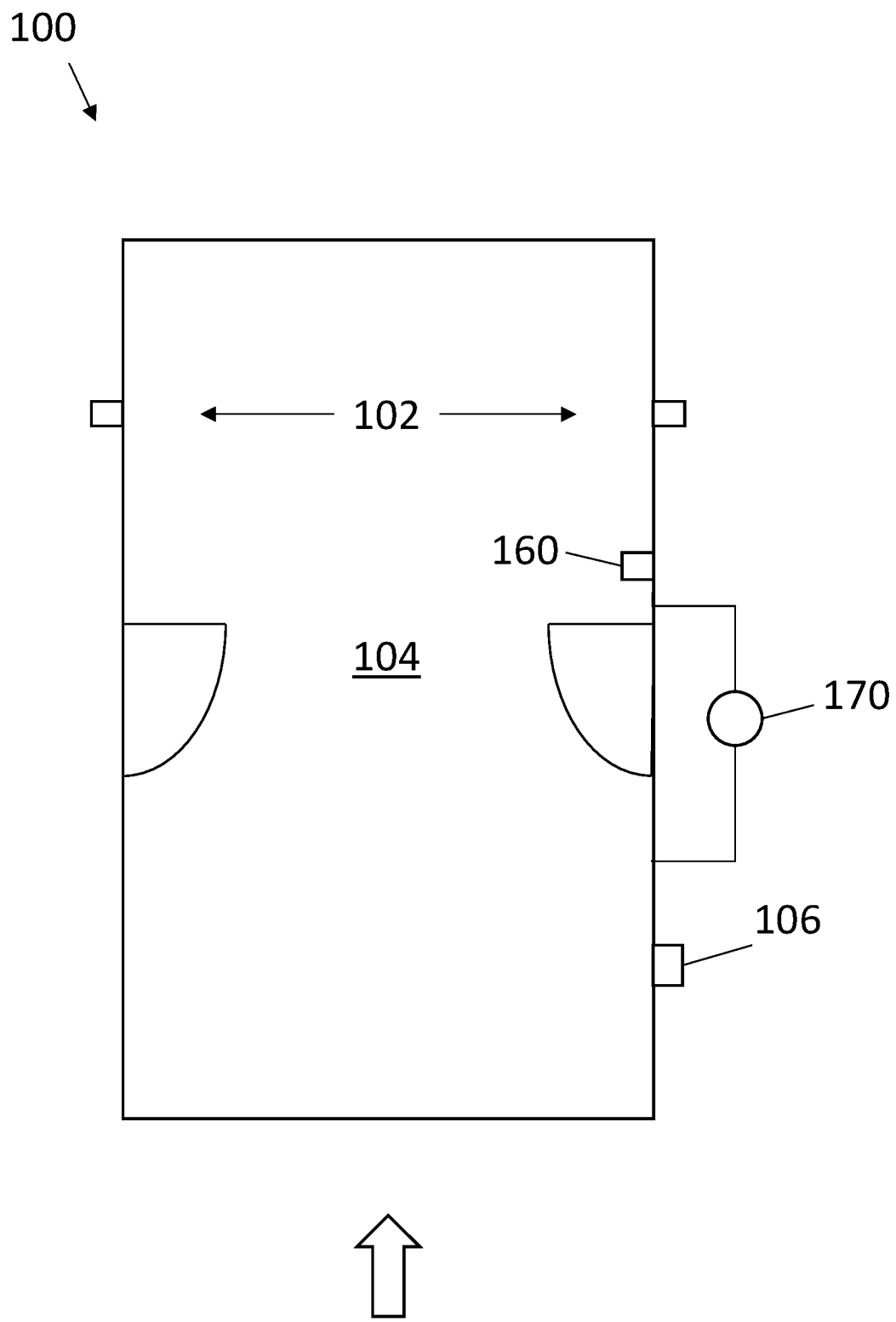
FIGS. 1A-1D are schematic views of flow measurement devices that can be used to practice the methods described herein to determine mass flow of a $CO_2$ rich stream.

Mass flow rate measurement with relative error less than about 2.5% is needed for many $CO_2$ flow CCUS or CCS applications at topside or subsea. Such error in flow rates can be realized by using a flow restriction (such as an orifice plate, a flow nozzle, or a Venturi device) to detect a pressure drop across the flow restriction of a flowing $CO_2$-rich stream, and co-locating with the flow restriction a bulk fluid dielectric permittivity sensor. Flow rates from pressure drop measured across a flow restriction are available using known relations. For example, using a Venturi flow restriction, mass flow rate is given by the following known equation:

$$Q_m = \sqrt{2/(1-\beta^4)} C_d(\text{Re}) A_T \sqrt{\rho \Delta P} \quad (1)$$

where $Q_m$ is the mass flow rate, $C_d$ is the discharge coefficient, which is a function of Reynolds Number Re, $A_T$ is the Venturi throat cross-sectional area, and $\beta$ is the ratio of throat diameter to inlet diameter. Density of the fluid is $\rho$ and pressure drop across the Venturi flow restriction is $\Delta P$. Reynolds Number, at a Venturi flow restriction, is related to mass flow rate by the following equation:

$$\text{Re} = \frac{V D}{\mu/\rho} = \frac{V D}{\eta} = \frac{4 Q_m}{\pi D \mu} \quad (2)$$

where D is the Venturi throat inner diameter, $\mu$ is the dynamic viscosity, V is the flow velocity at the Venturi throat section, $\eta$ is the kinematic viscosity. Discharge coefficients are available as tables or equations incorporating Reynolds Number. Thus, if flow pressure drop and fluid bulk density are known, an iterative process can be followed to calculate the Reynolds Number and discharge coefficient and to converge upon the mass flow rate of a stream.

Fluid bulk density of a $CO_2$ rich stream can be ascertained from measuring bulk (relative) dielectric permittivity or dielectric constant $\varepsilon_r$ of the $CO_2$ rich stream. Research shows that, for $CO_2$, bulk fluid dielectric permittivity of $CO_2$ can be fitted to a quadratic function of bulk density to high precision, largely independent of flow pressure and temperature, as follows:

$$\varepsilon_r = 1 + A\rho + B\rho^2 \quad (3)$$

where $A=5.099\times10^{-4}$ m$^3$/kg and $B=1.189\times10^{-7}$ m$^6$/kg$^2$. Equation 3 is shown to be valid at pressures of 1 bar to 300 bar and temperatures of 0° C. to 80° C., covering the pressure and temperature operating range of the CCUS applications. The critical point $CO_2$ density is $\rho_c$=464 kg/m$^3$ and the corresponding dielectric permittivity is $\varepsilon_{r,c}$=1.262. Research also shows that, unlike the dynamic viscosity ($\mu$), the kinematic viscosity of $CO_2$ has a similarly good correlation with the bulk fluid dielectric permittivity, largely independent of flow pressure and temperature, as follows:

$$\eta = \eta_0 e^{L(1-\varepsilon_r)} + \eta_c, \text{ for } \varepsilon_r \leq \varepsilon_{r,c}, \text{ gas conditions} \quad (4a)$$

$$\eta = \eta_c(1+\varepsilon_r-\varepsilon_{r,c}), \text{ for } \varepsilon_r > \varepsilon_{r,c}, \text{ liquid, dense, supercritical conditions} \quad (4b)$$

where $\eta_0$ is an initial gas-phase $CO_2$ kinematic viscosity at a low density available from literature, L is a regression coefficient of experimental data available from literature, $\eta_c$ is the kinematic viscosity of $CO_2$ at critical conditions, also available from literature. Dynamic and kinematic viscosity are related as (see, also, Eq. 2):

$$\eta = \frac{\mu}{\rho}. \tag{5}$$

The presence of impurities (such as $N_2$) in $CO_2$ rich streams has little effect on the permittivity-versus-density correlation (Eq. 3) and on the permittivity-versus-kinematic viscosity correlation (Eq. 4). Thus, if dielectric permittivity of a $CO_2$ rich stream can be ascertained, density and viscosity can be calculated and mass flow rate can be determined from pressure drop measured across a standard flow restriction, such as the Venturi flow restriction exemplified above.

Generally, microwave transmission and reflection properties of fluids can be used to determine bulk dielectric permittivity of a $CO_2$ rich stream. A microwave transmitter-receiver pair can be used to detect a cut-off frequency of microwaves propagating within a measurement pipe section (a circular waveguide) with a flowing $CO_2$ rich stream. The transmitter-receiver pair are installed such that the transmitter transmits microwaves into the flowing fluid, and the receiver can be disposed at a location opposite from the transmitter, such that the transmitter-receiver pair is oriented along a diameter of the flow pathway of the measurement pipe cross section. The transmitter and receiver can also be disposed in locations that are not directly opposite, one from the other. The transmitter may transmit microwaves at a suitable range of frequencies in the (circular waveguide) measurement pipe section, and attenuation of the signals is measured by the receiver at the corresponding range of frequencies. The peak frequency at which signal attenuation is minimized, sometimes referred to as a "cutoff frequency" (of a dominant propagation mode such as the $TE_{11}$ mode), can be related to bulk dielectric permittivity using one of the following equations:

$$f_c = K_{mode} \frac{c_0}{D\sqrt{\varepsilon_r}}; \tag{6a}$$

$$\varepsilon_r = \left(\frac{f_{c,0}}{f_c}\right)^2, \tag{6b}$$

where $f_c$ is a dominant mode cutoff frequency, $K_{mode}$ is the dominant mode coefficient ($K_{mode}=0.586$ for the $TE_{11}$ mode, $K_{mode}=0.97$ for the $TE_{21}$ mode,), $f_{c,0}$ is the cutoff frequency measured at a standard condition where permittivity is equal to unity, such as in an empty pipe, $c_0$ is the vacuum speed of light, D is the flow pathway diameter of the measurement pipe section, and $\varepsilon_r$ is the bulk fluid dielectric permittivity of the fluid. Equations 6a and 6b can be used together, or only one of equations 6a and 6b can be used. Equation 6b can be used if cutoff frequency at the standard condition is known. Otherwise, equation 6a can be used to determine the bulk fluid dielectric permittivity. As an example, with a sufficiently high-frequency scan resolution, the measurement of cutoff frequency (and hence the permittivity and density determination) can be obtained with accuracy in the range of 489 MHz to 692 MHz for the $TE_{11}$ mode (with $\varepsilon_r$ from 2 to 1) for a 10-inch diameter pipe.

Two microwave transmitter-receiver pairs can be used for an accurate determination of fluid dielectric permittivity from a combined drift-immune transmission attenuation measurement. In a $CO_2$ rich flow measurement pipe section, two microwave transmitter-receiver pairs can be installed at two different pipe cross sections, or at the same pipe cross section, with the said cross section(s) being at the upstream, or at the restriction, or at the downstream of a flow restriction, such as at the inlet section, or the throat section, or the outlet section of a Venturi device. In one embodiment of two microwave transmitter-receiver pairs being installed at two different pipe cross sections, the two transmitter-receiver pairs can be installed along two intersecting diameters of the flow pathway or along two non-intersecting diameters of the flow pathway. The four transmission measurement data of the two pairs can be used to obtain one transmission measurement to improve accuracy and stability by compensating for instrument gain drift. A first transmitter-receiver pair $T_1$ and $R_1$ can be installed at a first diameter of the flow pathway and a second transmitter-receiver pair $T_2$ and $R_2$ can be installed at a second diameter of the flow pathway that does not intersect with the first diameter. At a suitably high transmitting frequency (that is below the cutoff frequency), the two transmitter-receiver pairs enable four measurements of attenuation at two substantially different transmitter-receiver (far and near) spacings, a $T_1$-$R_1$ measurement $f_{11}$ (directly across the flow pathway with a near-spacing), a $T_1$-$R_2$ measurement $f_{12}$ (across the flow pathway and axially displaced with a far-spacing), a $T_2$-$R_2$ measurement $f_{22}$ (directly across the flow pathway with substantially the same near-spacing), and a $T_2$-$R_1$ measurement $f_{21}$ (directly across the flow pathway and axially displaced with substantially the same far-spacing). A compensated differential measurement can be determined from the four measurements, as follows:

$$f_{cdm} = \frac{1}{2}(f_{11} - f_{12} + f_{22} - f_{21}). \tag{7}$$

Dielectric permittivity is quadratically correlated to the compensated differential measurement, as follows:

$$\varepsilon_r = 1 + a\Delta f_{cdm} + b\Delta f_{cdm}^2, \tag{8}$$

where $\Delta f_{cdm} = f_{cdm}(\varepsilon_r) - f_{cdm}(\text{empty pipe})$, a and b can be determined by correlation of the modeling results from 3D electromagnetic simulations or from experiments. Note that a and b are dependent on the transmitting frequency, the transmitter-receiver antenna types (magnetic dipole or electric dipole), and the transmitter-receiver antenna spacings, and the pipe diameter.

Dielectric permittivity can also be determined using low-frequency capacitance sensors, as is known in the art. Such sensors can be used, optionally with electrical capacitance tomography techniques known in the art, to determine dielectric permittivity instead of, or in addition to, measurements using microwave sensors.

Research shows that the above relations are durable where some impurities are present in a carbon-captured $CO_2$ stream. The relations above have been shown to hold closely for pure $CO_2$ and pure $N_2$ over the pressure and temperature ranges normally encountered in a CCUS process. A post-combustion and pre-combustion captured $CO_2$ rich stream typically has at least 95 vol % $CO_2$, where $N_2$ and $O_2$ are present in a small quantity up to 1.3 vol % and where water is present in a quantity up to 600 ppmv. Where a continuous flow of a $CO_2$ rich stream contains, or is expected to contain, free water, the free water (having a high permittivity $\varepsilon_r=40$ to 80, depending on salinity and temperature) can be detected using a microwave reflection sensor. The microwave reflection sensor is installed at an internal wall of the flow pathway to resolve a large dielectric permittivity of any liquid water along the wall. A probe of the microwave reflection sensor may be optionally configured to contact any liquid water flowing along the wall to provide near-wall permittivity and conductivity readings that can be used to detect the presence of free water that may cause flow-assurance issues (such as the risks of formation of $CO_2$ ice-like hydrates or the risks of carbonic-acid pipe corrosion), and to resolve water salinity (calculated from near-wall water-rich permittivity and conductivity readings). Dielectric permittivity of a $CO_2$ stream with dispersed water can be ascertained using a suitable dielectric mixing model, such as a simplified Ramu-Rao model, as follows:

$$\varepsilon_r = \varepsilon_{CO2}\left(\frac{1+2\alpha}{1-\alpha}\right), \qquad (7)$$

where $\alpha$ is the volumetric water holdup (e,g, up to 600 ppmv) that may be determined from the $\varepsilon_r$ measurement from the microwave reflection sensor, or from the microwave transmission cutoff-frequency or from the compensated differential attenuation, and $\varepsilon_{CO2}$ is the dielectric permittivity of the non-water portion of the $CO_2$ stream that can then be used to calculate mass flow rate using the relations above. A microwave reflection sensor can be used with any combination of the other microwave sensors described above. The microwave reflection sensor may be located substantially in the same plane as one or more microwave transmitter-receiver pairs, or in a different plane.

FIGS. 1A-1D are schematic views of flow measurement devices that can be used to practice the methods described herein to determine mass flow of a $CO_2$ rich stream. FIG. 1A shows a flow measurement device 100 that uses a single microwave transmitter-receiver pair 102. The microwave transmitter-receiver pair 102 is shown located at an outlet side of a flow restriction 104 of the flow measurement device. An optional microwave reflection sensor 106 is included in the flow measurement device 100. Here, the microwave reflection sensor 106 is located at an inlet side of the flow restriction 104. The flow restriction 104 may be a flow nozzle flow restriction or another flow restriction such as a Venturi-style or an orifice plate whose pressure drop properties are closely related to flow rate.

Figure 1B:
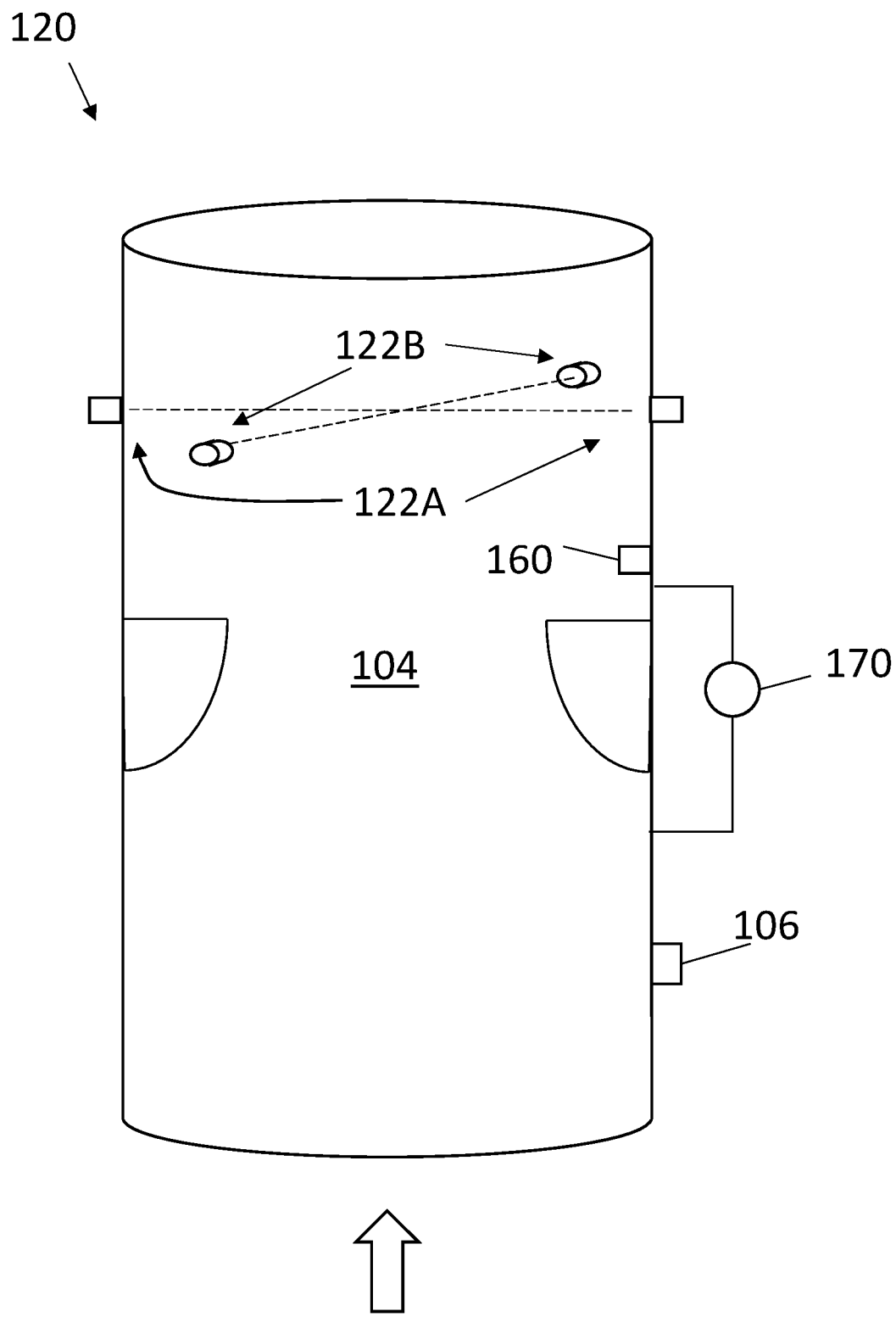

FIG. 1B shows a flow measurement device 120 that uses two pairs of microwave transmitter-receivers 122A and 122B. In this case, the pairs 122A and 122B are located along intersecting diameters of the flow measurement device 120. The view of FIG. 1B is slightly vertically angled to show the positional relationship of the two pairs 122A and 122B.

Figure 1C:
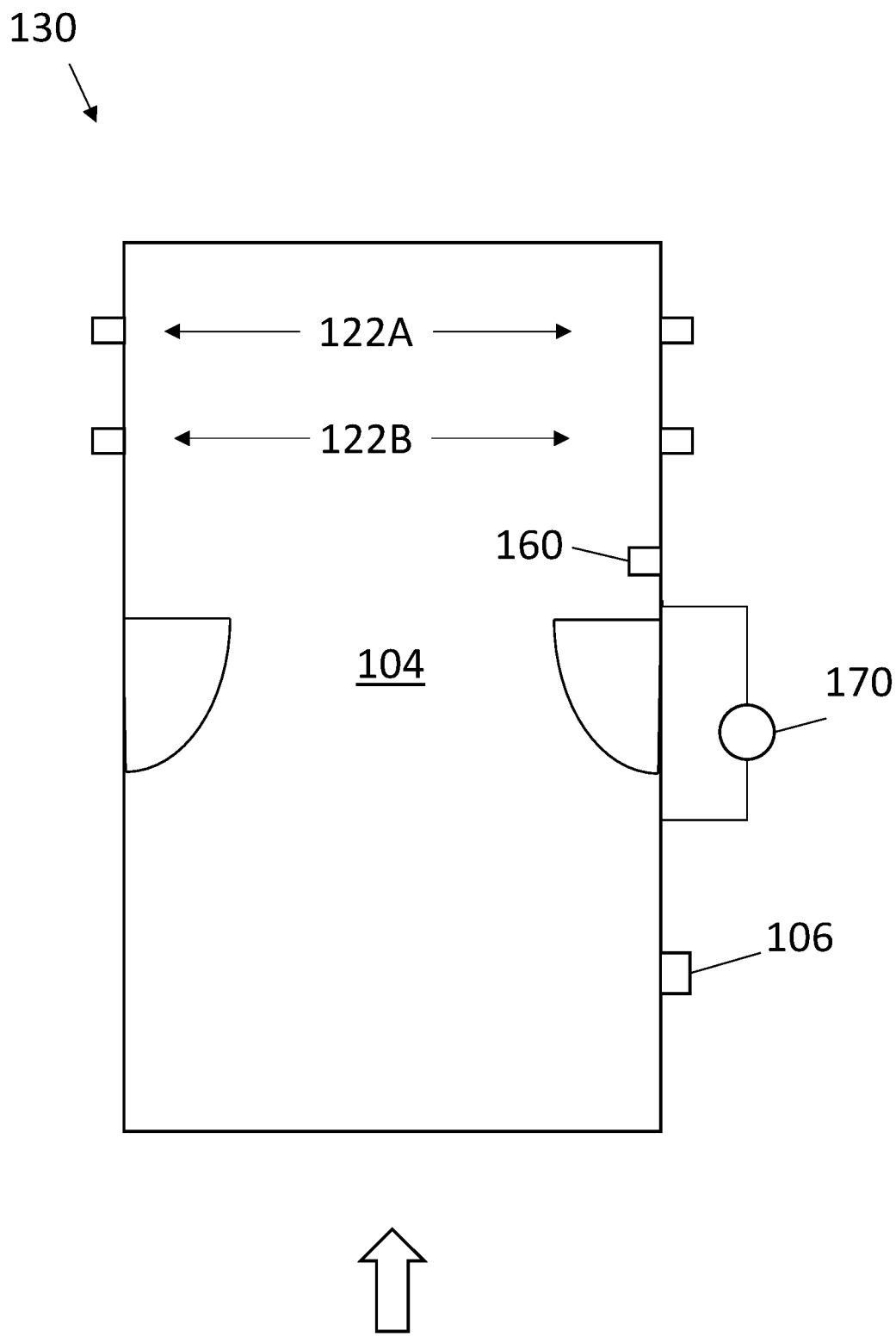
Figure 1D:
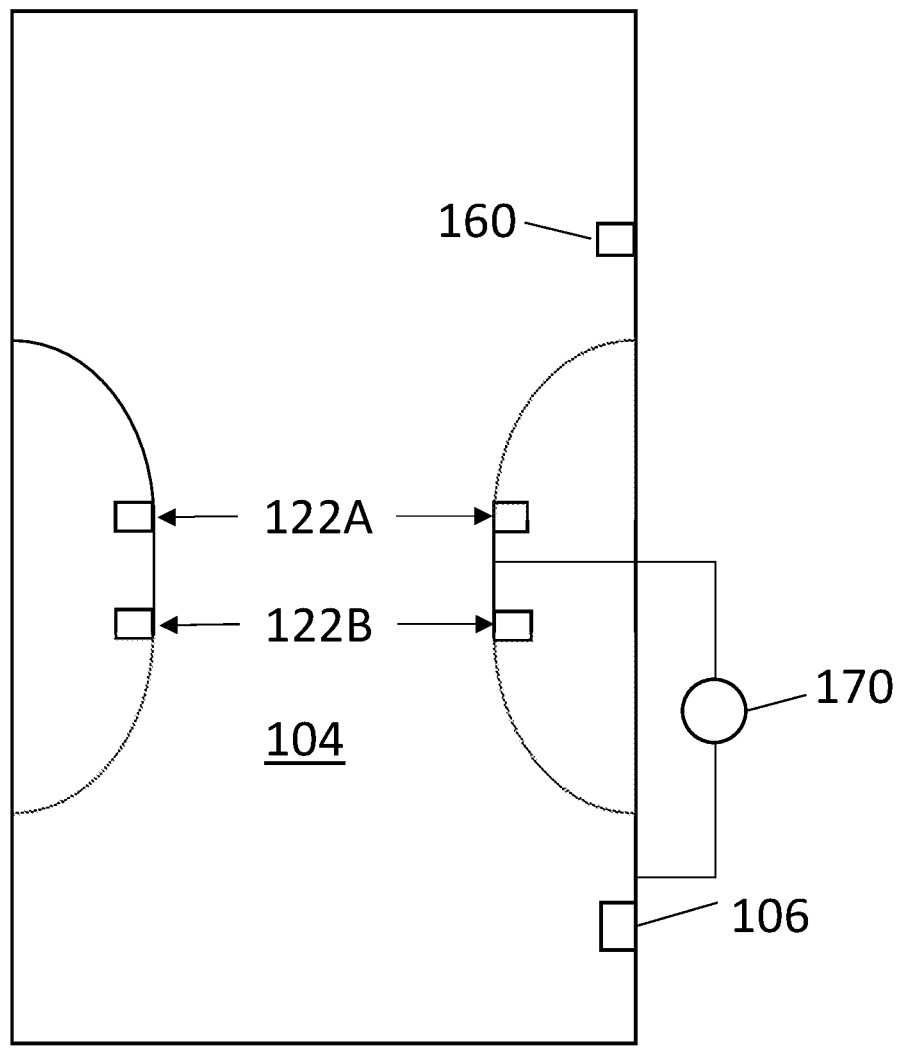

FIG. 1C shows a flow measurement device 130 that uses the two pairs of microwave transmitter-receivers 122A and 122B located along non-intersecting diameters of the flow measurement device 130. The flow measurement devices 120 and 130 use the same flow restriction as the flow measurement device 100, and both also have an optional microwave reflection sensor 106, as in the flow measurement device 100. As noted above, each of the flow measurement devices 100, 120, and 130 can use a Venturi-style flow restriction as illustrated in FIG. 1D where the two pairs of microwave transmitter-receivers 122A and 122B are located along non-intersecting diameters of the flow measurement device 140 at the restriction (throat section) of a Venturi-style device. Each of the flow measurement devices 100, 120, 130 and 140 has an optional temperature sensor 160 located at an outlet side of the flow restriction in each case. Each device 100, 120, 130 and 140 also has a differential pressure instrument 170 to measure the pressure and pressure drop across the flow restriction. A digital processing system can be configured to receive signals from the various sensors of the flow measurement devices 100, 120, 130 and 140 and to calculate mass flow rate of the $CO_2$ rich stream flowing therein using the relations described above.

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. A method for a flow measurement device, comprising:
restricting a flow of a $CO_2$ rich stream flowing in a flow pathway of the flow measurement device using a flow restriction in the flow pathway of the flow measurement device;
disposing a first microwave transmitter-receiver pair respectively opposing each other across the flow pathway on an interior surface along a first diameter of the flow pathway at an outlet side of the flow restriction in the flow pathway of the flow measurement device;
disposing a second microwave transmitter-receiver pair respectively opposing each other across the flow pathway on the interior surface of the flow pathway along a second diameter of the flow pathway, the second diameter intersecting the first diameter;
disposing a differential pressure instrument across the flow restriction in the flow pathway of the flow measurement device;
measuring, by the first microwave transmitter-receiver pair and the second microwave transmitter-receiver pair, a dielectric permittivity of the $CO_2$ rich stream flowing in the flow pathway of the flow measurement device;
determining, by the flow measurement device, a density of the $CO_2$ rich stream from the measured dielectric permittivity;
determining, by the flow measurement device, a viscosity of the $CO_2$ rich stream from the measured dielectric permittivity;
measuring, by the differential pressure instrument across the flow restriction in the flow pathway, a pressure drop of the $CO_2$ rich stream flowing through the flow restriction; and
determining, by the flow measurement device, a mass flow rate of the $CO_2$ rich stream using the measured pressure drop, the determined density, and the determined viscosity.

2. The method of claim 1, further comprising:
measuring, by the flow measurement device, a dielectric permittivity at the interior surface of the flow pathway;
detecting, by a microwave reflection sensor disposed at an inlet side of the flow restriction on the interior surface of the flow pathway of the flow measurement device, a presence and a salinity of a free water at the interior surface;

resolving, by the flow measurement device, a volumetric fraction of the free water; and ascertaining, by the flow measurement device, a dielectric permittivity of a water-free portion of the $CO_2$ rich stream from the measured dielectric permittivity of the $CO_2$ rich stream and the free water volumetric fraction.

3. The method of claim 2, further comprising:

disposing a temperature sensor on the interior surface of the flow pathway of the flow measurement device;

measuring, by the temperature sensor, a temperature of the $CO_2$ rich stream; and determining a permittivity of the free water volumetric fraction from the measured dielectric permittivity and temperature of the $CO_2$ rich stream.

4. The method of claim 1, further comprising:

measuring, by the flow measurement device, a dielectric permittivity across the flow pathway;

detecting, by the flow measurement device, a dispersed water volumetric fraction; and ascertaining, by the flow measurement device, a dielectric permittivity of a water-free portion of the $CO_2$ rich stream from the measured dielectric permittivity of the $CO_2$ rich stream and the dispersed water volumetric fraction.

5. A flow measurement device, comprising:

a flow pathway including an interior surface;

a flow restriction in the flow pathway, the flow restriction being configured to restrict a flow of a $CO_2$ rich stream flowing in the flow pathway;

a first microwave transmitter-receiver pair respectively opposing each other across the flow pathway on an interior surface along a first diameter of the flow pathway at an outlet side of the flow restriction in the flow pathway of the flow measurement device, the first microwave transmitter-receiver pair being configured to measure a dielectric permittivity of the $CO_2$ rich stream flowing in the flow pathway;

a second microwave transmitter-receiver pair respectively opposing each other across the flow pathway on the interior surface of the flow pathway along a second diameter of the flow pathway, the second microwave transmitter-receiver pair being configured to measure the dielectric permittivity of the $CO_2$ rich stream flowing in the flow pathway, the second diameter intersecting the first diameter;

a differential pressure instrument disposed across the flow restriction in the flow pathway, the differential pressure instrument being configured to measure a pressure drop, across the flow restriction, of the $CO_2$ rich stream flowing through the flow restriction; and a digital processing system configured to:
  determine a density of the $CO_2$ rich stream from the measured dielectric permittivity;
  determine a viscosity of the $CO_2$ rich stream from the measured dielectric permittivity; and
  determine a mass flow rate of the $CO_2$ rich stream using the measured pressure drop, the determined density, and the determined viscosity.

6. The flow measurement device of claim 5, further comprising:

a microwave reflection sensor disposed at an inlet side of the flow restriction on the interior surface of the flow pathway of the flow measurement device, the microwave reflection sensor being configured to detect a presence and a salinity of a free water at the interior surface, wherein the first microwave transmitter-receiver pair is further configured to measure a dielectric permittivity at the interior surface of the flow pathway, and wherein the digital processing system is further configured to:
  resolve a volumetric fraction of the free water, and
  ascertain a dielectric permittivity of a water-free portion of the $CO_2$ rich stream from the measured dielectric permittivity of the $CO_2$ rich stream and the free water volumetric fraction.

7. The flow measurement device of claim 6, further comprising:

a temperature sensor disposed on the interior surface of the flow pathway, the temperature sensor being configured to measure a temperature of the $CO_2$ rich stream; and the digital processing system is further configured to determine a permittivity of the free water volumetric fraction from the measured dielectric permittivity and temperature of the $CO_2$ rich stream.

8. The flow measurement device of claim 5, wherein:

the first microwave transmitter-receiver pair is further configured to measure a dielectric permittivity across the flow pathway; and the digital processing system is further configured to:
  detect a dispersed water volumetric fraction; and
  ascertain a dielectric permittivity of a water-free portion of the $CO_2$ rich stream from the measured dielectric permittivity of the $CO_2$ rich stream and the dispersed water volumetric fraction.

\* \* \* \* \*